No. 720,182. PATENTED FEB. 10, 1903.
C. R. SANDVIG.
LAMP STOVE.
APPLICATION FILED AUG. 8, 1902.
NO MODEL.
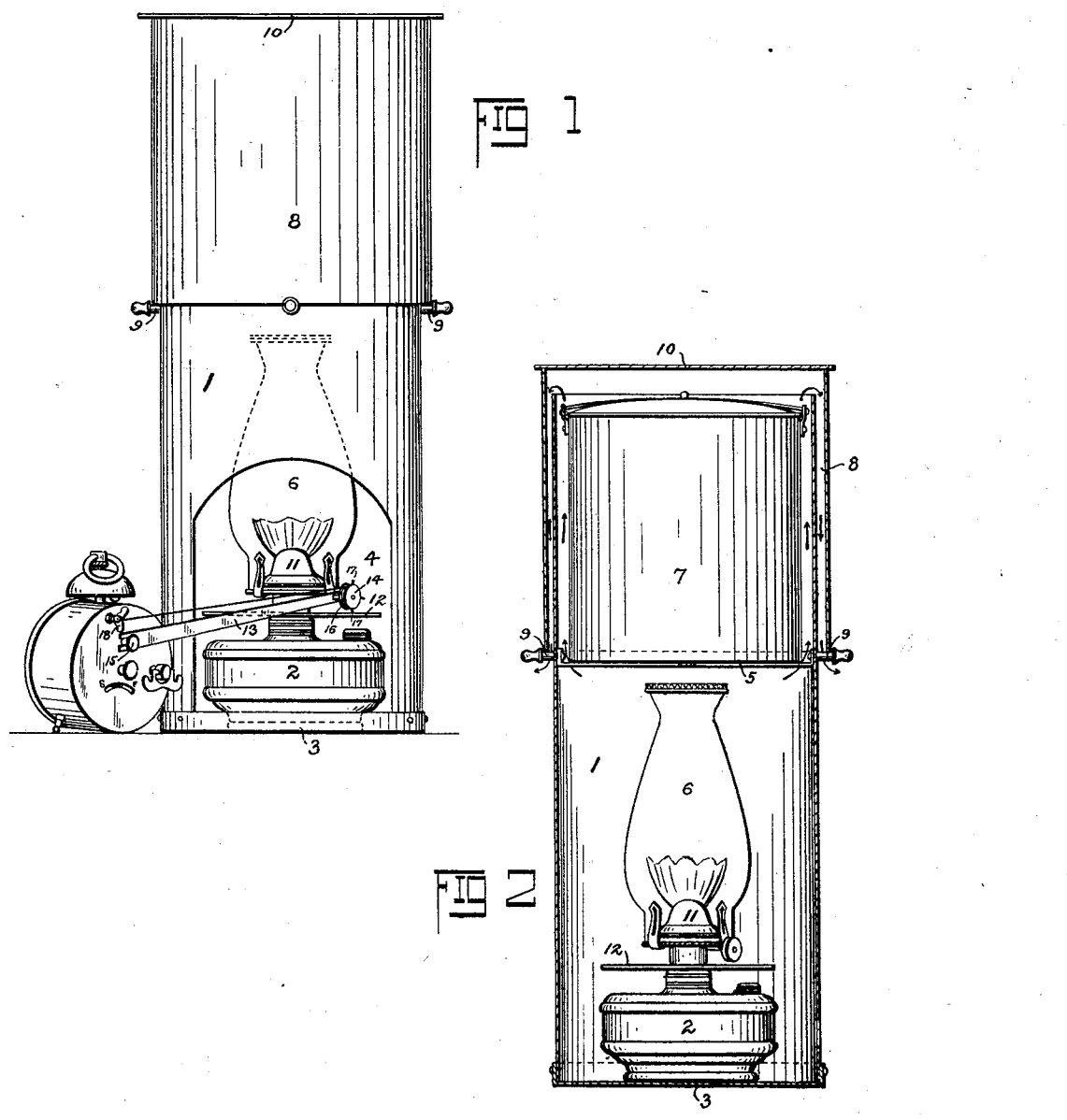
Witnesses;
Edward Nelson
Elsie Mallory.
Inventor;
Charles R. Sandvig,
By Harry Frease Attorney.

UNITED STATES PATENT OFFICE.

CHARLES R. SANDVIG, OF CANTON, OHIO.

LAMP-STOVE.

SPECIFICATION forming part of Letters Patent No. 720,182, dated February 10, 1903.

Application filed August 8, 1902. Serial No. 118,855. (No model.)

*To all whom it may concern:*

Be it known that I, CHARLES R. SANDVIG, a citizen of the United States, residing at Canton, in the county of Stark and State of Ohio, have invented a new and useful Lamp-Stove, of which the following is a specification.

My invention relates to a stove for cooking with an ordinary oil-lamp; and the objects of my improvements are to conserve and retain the heat rising from the lamps, to prevent the heat from radiating downward, and to automatically reduce the lamp-flame when the cooking is completed. I attain these objects by the construction and mechanism illustrated in the accompanying drawings, in which—

Figure 1 is an elevation of the stove in connection with an alarm-clock; and Fig. 2, a vertical section of the stove, showing the lamp and cooking vessel in elevation.

Similar numerals refer to similar parts throughout the drawings.

The stove 1 is preferably a sheet-metal cylinder, as the section of an ordinary stove-pipe set on end. The stove can be open at the bottom and merely set over the lamp 2, with a suitable ventilating and viewing hole in the side; but the bottom 3 is preferably attached, and in this event the aperture 4 is formed in the lower side of the stove large enough to admit the insertion of the lamp.

The open frame 5 is attached in the stove a short distance above the top of the lamp-chimney 6, on which frame is rested the cooking vessel 7, which may be an ordinary bucket with a lid, as illustrated, or a tea-kettle, coffee-pot, or other culinary receptacle less in diameter than the stove.

Around the upper part of the stove proper is located the heat-retaining jacket 8, which is preferably a sheet-metal tube, larger in diameter than the stove proper, with its lower edges located above the top of the lamp-chimney and resting on the brackets 9 on the outer side of the stove proper and its upper edge extending a short distance above the stove proper. The brackets 9 are preferably formed with knobs or handles on their outer ends, by which the stove can be lifted and carried from place to place.

The cover 10 is preferably a sheet-metal plate resting on the upper edge of the jacket and can thus be readily removed and replaced for inserting or removing the cooking vessel.

The lamp being lighted, the vessel being inserted for cooking, and the cover being in place on the stove, the heat rising from the lamp will strike squarely against the bottom of the vessel. Thence the heat will rise around the sides of the vessel to the top of the stove and then descend around the outside of the stove proper and inside of the heat-retaining jacket to the lower edge thereof, whence it escapes, as indicated by arrows in Fig. 2. By thus retaining the heat and conducting it down around the outside of the stove proper the heat of the lamp is a great deal more effective than if no jacket or cover is used, and to prevent the radiation of heat downward from the lamp-burner 11 the disk 12 is attached immediately below the burner, which disk acts as a deflector by which the heat-rays are turned upward to be effective in the cooking.

The heating capacity of my stove is so uniform and constant that the time required to complete any particular kind of cooking or to heat the water in a given vessel can soon be gaged, and for the purpose of reducing or turning out the flame an ordinary alarm-clock can be used in connection with the lamp of the stove. The strut 13 is placed between the lamp and the clock to steady and hold them apart, the notched ends of the strut engaging the shanks of the wick-wheel 14 and the alarm-setting post 15, respectively. The periphery of the wick-wheel is provided with the groove 16 and with one or more radial pins 17. The flame being turned up, and the alarm mechanism being wound up by the key 18, and set to the hour it is desired to reduce or outen the flame, a coarse thread or thin cord is looped on one of the pins of the wick-wheel and passed in the peripheral groove around and over the wick-wheel and extended to an attachment with the shank of the alarm-winding key. When the alarm acts, the key turns and winds the thread or string on its shank, whereupon the wick is turned until the flame is reduced or outened, according to which radial pin the thread is looped, and the thread then slips off of the pin.

What I claim as my invention, and desire to secure by Letters Patent, is—

1. The combination of a lamp, a tube around said lamp there being an aperture in the lower part of said tube, a cooking vessel in said tube above said lamp, a jacket around said tube terminating above said lamp, and a cover on said jacket above said tube.

2. The combination of a lamp, a wick-wheel on said lamp, there being a peripheral groove and radial pins on said wheel, an alarm-clock, an alarm-winding key on said clock and a cord connecting said wheel and said key, said cord being looped on one of said pins and passed in said groove around said wheel and extended thence to said key.

In testimony whereof I have signed my name to this specification in the presence of two subscribing witnesses.

CHARLES R. SANDVIG.

Witnesses:
H. O. CAIN,
HARRY FREASE.